Patented Nov. 18, 1947

2,430,903

UNITED STATES PATENT OFFICE 2,430,903

FRUIT FLAVORED RAW CANE SUGARS

Alexander M. Zenzes, New York, N. Y.

No Drawing. Application August 12, 1943,
Serial No. 498,394

15 Claims. (Cl. 99—141)

This invention relates to the production of fruit flavored sugars which are made particularly from raw cane sugars without requiring the use of synthetic or natural fruit flavors and particularly to the preparation of fruit flavored syrups, jellies and gums made therefrom.

It has been found by treating substantially unrefined raw cane sugars in concentrated solution at certain pH ranges and temperatures and without substantial inversion a change takes place in the objectionable tasting raw cane sugars whereby they are converted into a composition having a desirable palatable fruity taste in highly stable condition.

By this treatment, the objectionable tasting raw sugars are acid and heat reacted and modified to form highly desirable, stable, homogeneous, non-oxidizable fruit flavor complexes.

An object of the present invention is therefore to provide a stable, nonperishable, nonvolatile, non-oxidizable fruit flavored syrup, jelly or gum made from raw cane sugar compositions in which the naturally occurring impurities of the raw cane sugar have been reacted to produce the highly desirable fruit flavored composition.

A further object is to provide a low cost, fruit flavored syrup, jelly or gum made from raw cane sugar constituents.

A further object is to convert the original raw cane sugar materials of low economic value into highly desirable, readily utilizable food compositions having great value.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, cane juice is defecated such as by treatment with lime and is then concentrated to crystallize out the raw sugar crystals each of which crystals contains a surface film of the non-crystallizable sugars and non-sugar impurities. The crystallization of the raw sugars from the defecated cane juice may be carried out in several successive stages whereby the non-crystallizable fraction from the first batch of raw sugar crystals is added to additional cane juice and then concentrated and crystallized again.

The raw cane sugar crystals used for the purposes of the present invention will contain between 0.35% and 1.5% total ash based upon total solids and should desirably not have been subjected to treatment with carbon, charcoal or other refining treatment to change qualitatively the non-sugar impurities naturally occurring in the raw sugar cane.

The raw cane sugar crystals thus obtained by crystallization of the defecated cane juice are then redissolved in water to obtain a raw sugar solution of over about 40 Brix, acidified to a pH of between 4.5 and 5.5, heated, preferably at superatmospheric pressures, to over 245° F. and desirably to between 255° F. and 290° F. for a period varying from 0 to about 15 minutes, but insufficient to cause any substantial inversion, desirably filtered and then acidified further to a pH of between 2.5 and 3.6, whereby a modification takes place in the objectionable tasting complexes of the raw cane sugar changing them into highly desirable fruit aromas and flavors.

The highly desirable fruit aroma and flavor obtained are non-volatile and non-oxidizable and will withstand long boiling periods even at temperatures of 250° F. to 260° F. or higher.

The acid and heat reacted raw cane sugar carrying the highly desirable fruit flavor may be concentrated or adjusted to the desired Brix required to produce a jelly, for example, such as to 65 Brix at which time the pectin is added in properly dispersed form. The finished product at 65 Brix is then allowed to cool and jellify whereby a jelly is obtained having an enhanced fruit flavor and aroma which flavor and aromatic qualities are stable, non-volatile and non-oxidizable.

The type of fruit flavor obtained may be controlled by the ash content of the raw cane sugar utilized in accordance with the procedures of the present invention. For example, raw cane sugar having an ash content of 0.5% will produce an apple or apricot flavor, whereas at an ash content of 0.75% to 1.0%, a guava or plum flavor is obtained and at an ash content of 1.0% to 1.5% a true prune flavor is obtained.

This is accomplished although the acid and heat reacted raw cane sugar or the jelly made therefrom is altogether devoid of the essential oils which are responsible for the apple, plum, guava or prune flavor normally contained in those materials.

The raw cane sugar of over about 40 Brix containing between 0.35% and 1.5% ash based upon total sugar solids is first desirably modified by adding about one-half of the total acid required to produce the desired pH of 2.5 to 3.6, following which the partially acid reacted raw sugar is heated to the elevated temperature of over 245° F. and the balance of the acid is added so as to increase the acidity to between pH 2.5 and 3.6 and complete the reaction.

The heat treatment and the pH adjustment between 2.5 and 3.6 appear to represent the critical limits to produce the desired fruit flavor and complete the modification of the objectionable tasting materials and to give a highly desirable fruit aroma and flavor.

The elevated temperature treatment to which the partially acidified raw cane sugar is subjected has been found of great importance to help complete the reaction and produce a clean fruity flavor, particularly where, after the heat treatment, the sugar composition is clarified to remove the precipitated and coagulated materials.

The undissolved, coagulated or precipitated material may be removed by filtration, centrifugalization, sedimentation or decantation.

In the filtration of the modified raw cane sugar, it is desirable to use an inert filtration agent such as diatomaceous earth. The use of activated carbon in the filtration of the reacted raw cane sugar has been found to be undesirable as where charcoal, carbon or other decolorizing agent is employed, the desirable fruit flavor characteristics of the present invention are not satisfactorily obtained.

Where the raw cane sugar has been heat reacted in an open vessel or at atmospheric pressure, which is not the preferred procedure, the removal of the coagulated or precipitated materials may take place before the syrup has been allowed to cool. Where desired, additional water can be added to dilute the syrup and to reduce its total solids content, for example, to about 50 to 70 Brix.

The heat treatment is desirably carried out in a pressure chamber at superatmospheric pressures to a temperature of about 260° F. to 290° F. The sugar composition may be subjected to an instantaneous heat treatment or may be held at the elevated temperature for a period of about 10 to 30 minutes. A heat treatment of about 10 minutes has been found most highly satisfactory.

The partially acidified raw sugar having a sucrose content of over 80% and desirably over 90% based upon total sugar solids is preferably not permitted to invert during the heat or acidification treatment to less than about 80% total sucrose content based upon total sugar solids and desirably no substantial inversion is permitted to take place during these treatments.

Although the raw sugar is heated in partially acidified condition as the preferred procedure, the raw sugar in substantially concentrated solution may less preferably either be first fully acidified to pH 2.5 to 3.6 followed by the heat treatment and filtration or first heated and then acidified to pH 2.5 to 3.6.

In the production of the novel fruit flavored jelly of the present invention there is desirably added to the solubilized raw cane sugar of at least 50 Brix half of the total acid required to produce pH 2.5 to 3.6 and the partially acid modified raw cane sugar mass is then heated to about 260° F. under pressure for about 0 to 10 minutes, filtered to remove precipitated materials, and concentrated to about 75 Brix at which time there is added to this composition the desired amount of pectin to produce jellification of the finished product, which pectin has been previously dispersed in water. The composition is then adjusted to the desired Brix, preferably 65 Brix at which time there is added the balance of the acid required to produce a pH of between 3.1 and 3.4. This product may then be poured into jars or molds and allowed to cool and jellify whereupon there is obtained the highly desirable fruit flavored stable product of the present invention.

Similar procedures may be followed in the preparation of gums where a higher concentration of solids is desired in the finished product.

Phosphoric acid is desirably utilized for the acidification of the raw cane sugar. There may also be utilized combinations of hydrochloric acid and the polycarboxylic aliphatic acids and including particularly the food acids such as tartaric acid, citric acid and malic acid or the polycarboxylic aliphatic acids may be used alone. There may also be used lactic acid, glycollic acid and less desirably sulphuric and similar acids or their various acid salts. Other acids which may be utilized are the dibasic acids such as succinic and malonic acid as well as the sugar acids such as gluconic acid and saccharic acid. The acids themselves should be free of noticeable flavor and are used for the sole purpose of reacting with the raw cane sugar in order to produce the fruit flavors of the present invention and the acids must be added in a sufficient quantity to produce the effective acidity in terms of pH concentration as indicated. It has not been found desirable, however, to use reducing acids of the nature of sulphurous acid or oxidizing acids such as nitric acid which appear to form objectionable constituents.

The amount of acid to be added is quite critical and it may be controlled in accordance with the ash content of the raw sugar.

In order to obtain the desired nonvolatile fruit flavor and aroma it is necessary to add between about 25 and 200 parts and desirably between 75 and 100 parts of tartaric acid or its acid equivalent based upon the standard pH scale to each 100 parts of ash on total solids in the raw sugar.

For example, to raw cane sugar containing 1.0% ash based on total solids there is added between 0.75% and 1.5% and preferably an equal amout by weight of tartaric acid or its acid equivalent to obtain the desired pH and the desired fruit flavor.

In the production of the jelly or gum of the present invention there is desirably added to the sugar composition 1 part of pectin to at least 0.75 to 2.5 parts of acid and preferably about 1.5 parts of acid, the amount of acid required being in turn determined critically by the ash content of the sugar composition.

This acid requirement is greatly in excess of the amount of acid normally required to produce any other type of jelly.

The concentrated, acid and heat reacted raw cane sugar obtained by the procedures of the present invention assumes the character of a fruit with no characteristic whatsoever of the original raw cane sugar.

The raw cane sugar should not be filtered through bone char or charcoal but may only be filtered through a non-decolorizing filtration agent such as diatomaceous earth.

As examples of the utilization of the present invention, the following may be noted:

*Example I*

1000 pounds of raw cane sugar crystallized from defecated cane juice were dissolved to 50

Brix and found to contain 0.6% total ash based upon total solids.

There was prepared a solution containing 6 pounds tartaric acid in 6 pounds of water. To the raw cane sugar of 50 Brix there was added 6 pounds of the 50% solution of tartaric acid. The partially acid reacted or modified raw cane sugar containing one-half of the total acid was then heated under pressure to between 270° F. and 290° F. for 5 minutes, allowed to cool and filtered. At this time the balance of 6 pounds of the 50% tartaric acid solution was added and this concentrated acid and heat reacted raw cane sugar was found to have a pH of 3.0. The product was then further concentrated to 68 Brix.

This product was found to have a highly desirable fruit aroma and flavor and even after boiling for extended periods of time or when the product was used in the production of other manufactured foods its natural fruit flavor was not lost or diminished.

*Example II*

1000 pounds of raw cane sugar crystallized from defecated cane juice were dissolved to 50 Brix and found to contain 0.6% total ash based upon total solids.

Sufficient phosphoric acid was then added to produce a pH of 5.0 and the partially acidified raw cane sugar was then heated under pressure to a temperature of 270° F. for 10 minutes, allowed to cool and filtered. This sugar composition was then concentrated to 75 Brix under reduced pressure.

There was then prepared a pectin solution in which 10 pounds of pectin were prepared in the form of a 4% water solution and the pectin solution was then added to the raw sugar composition with agitation.

This product was then adjusted to 65 Brix at which time the balance of the phosphoric acid was added to produce pH 2.9.

The product was still in fluid condition and was poured into jars to alow to cool and "set."

The product obtained in accordance with the procedures of Example II was found to have an enhanced and improved fruit flavor and aroma which appeared to be even more emphasized than the product of Example I.

*Example III*

1000 pounds of raw cane sugar crystallized from defecated cane juice were dissolved to 50 Brix and found to contain 0.6% total ash based upon total solids.

The raw cane sugar was then instantaneously heated under pressure to 275° F., allowed to cool and filtered. The heat reacted sugar composition was then concentrated to 75 Brix and acidified to pH 3.1 by the addition of phosphoric acid whereby a desirable fruit flavor was obtained.

It is particularly surprising to find that in accordance with the procedure outlined in Example II the product does not rapidly or prematurely "set" without giving time to place in molds as is normally encountered in the preparation of the usual type of concentrated jellies. Under normal conditions where a jelly is made from a fruit juice and sugar, for example, there is insufficient time available to place the finished product into molds and the product goes from a liquid state into a gel almost instantaneously. On the other hand, in accordance with the procedure of the present invention, the "setting" is naturally retarded and sufficient time is afforded for the proper packaging and handling of the finished product.

The products of the present invention have been found of great value in the production of a wide variety of foods such as in the manufacture of jellies and gums for confectionery purposes, in the bakery industry, for beverages and soft drinks, in the preparation of alcoholic beverages or cordials, for ice cream, sherbets or ices, and for similar food compositions.

Furthermore, in accordance with the present invention, the amount of acid that is added is very substantially in excess of that which would enable one otherwise to produce a satisfactory product such as is required in the preparation of an ordinary fruit jelly. The acid that is added in accordance with the present invention is five to eight times or more that which it would be possible to add with any pectin solution in the preparation of a standard fruit jelly without damaging the normal jelly structure.

Furthermore, by the addition of this excessive amount of acid which may amout to 2 parts of tartaric acid or its acid equivalent, for example, and 1 part of pectin and 1 part of ash, there results a reaction to, first of all, produce the fruit flavor that is so highyl desirable and, secondly, obtain proper jellification notwithstanding this high acid treatment.

Normally, in the preparation of a fruit jelly, for example, with each 1 part of pectin there is added not over about ¼ part to ⅓ part of tartaric acid or its acid equivalent. If the amount of acid is in excess of this ⅓ part, then the jelly does not form satisfactorily, the pH level being too low.

In accordance with the procedures of the present invention, however, there is added between 4 and 12 times the amount of acid that would be normally required to produce a standard fruit jelly and in spite of this high amount of acid added, the pH is then within the desired range of about 3.1 to 3.4 and a satisfactory jelly may be produced.

Strangely, the fruit characteristic of the acid and heat reacted raw cane sugar appears to be a combination of plum, guava, currant, wild raspberry and prune with the objectionable characteristics of the raw sugar entirely gone.

Of particular importance is the fact that these novel flavors are produced in substantially nonvolatile condition so that when used in the manufacture of other foods where additional concentration or boiling is employed, the aromatic constituents and flavor complexes are not volatilized but are fully retained.

The nonvolatile character of the fruit flavor obtained in accordance with the present invention is of particular importance for all food products where high temperature treatment is involved and particularly in the manufacture of the so-called confectionery gums.

These gums are now limited to the use of artificial flavoring ingredients which artificial flavors, consisting principally of essential oils, are added at the close of the boiling treatment because of their high volatility. The natural fruit juices do not withstand the high and prolonged cooking temperatures to which the confectionery gums are subjected and therefore the natural fruits and fruit juices are not used in the production of the confectionery gums.

However, in accordance with the procedures of the present invention the raw cane mass or composition may very readily be employed in the production of these confectionery gums since prolonged and high temperature cooking does not appear to affect their intensity or desirability of fruit flavor and the finished confectionery gum or similar product which has been subjected to extensive and prolonged high temperature treatment will retain its natural desirable fruit flavor.

Furthermore, in accordance with the present invention, a product of concentrated food value is obtained, which product although in acid condition reverts to an alkaline condition upon ingestion, and there are retained the natural vitamin values, minerals and other constituents originally present in the raw cane sugar although in reacted form.

One of the most desirable features of the present invention is that the product of the present invention will greatly enhance and support other fruit flavors and serves as a better base for all fruit flavors since with less addition of flavor, a stronger flavor is obtained.

For example, the addition of only about ¼ to 1/10 the amount of peaches or peach flavor or cherries or cherry flavor or prunes or prune flavor is required when used in combination with the raw sugar composition of the present invention to give the same intensity of flavor and aroma as would normally be required by the full quantity of peaches or cherries or prunes. This is of great importance in connection with the manufacture of jellies, and also in the production of canned fruits, fruit syrups, fruit juices and ices and ice creams.

Furthermore, when the products of the present invention are utilized in this manner they will contain no artificial flavor, coloring matter or preservative and are high in intrinsic food value so that by the procedures of the present invention a product of low economic value and containing materials that are normally converted into waste products is changed into materials of high economic value.

One of the most unusual characteristics of the products produced in accordance with the present invention is that the flavors are non-oxidizable and will retain their original flavor and aroma characteristics over long periods of time without change or diminution.

Whereas normally the flavors in food products are very readily oxidizable so that upon exposure to air or light or upon storage they lose their natural flavor characteristics or they develop objectionable flavor characteristics; or whereas other food products having certain aromas and flavors contain the aromas and flavors in the form of highly volatile essential oils, the products of the present invention have flavors which are non-oxidizable and substantially non-volatile.

For example, the products made in accordance with the present invention may be boiled over long periods of time or carried at elevated temperatures without loss or diminution of their natural flavors or they may be stored for a period of two or more years even under conditions of relatively high temperature and humidity or upon exposure to light and the flavors are still retained.

Where it is desired to adjust the ash content of the raw cane sugar to produce the specific desired fruit flavor between the limits of 0.35% and 1.5% ash based on total solids, this may be accomplished in one of several ways.

For example, if the ash content is too high, sweetening agents such as sucrose, including refined cane or beet sugar, dextrose, corn syrup, lactose, etc., may be added. In order to obtain an ash content of 0.5% from a raw cane sugar having an ash content of 1.0%, one part of the raw cane sugar or of the acid and heat modified raw cane sugar may be combined with one part of refined sucrose, dextrose or corn syrup, but the acidity of the combined sugars should be between the critical limits of 2.5 and 3.6 at the concentration of final use. Where the raw cane sugar is first combined with the additional sweetening agent to provide the desired ash content without the raw cane sugar having first been subjected to the elevated temperature treatment, then the combination of the raw cane sugar and the sweetening agent is subjected to the elevated temperature treatment in order to obtain the fully desired results of the present invention.

Where the ash content of the raw cane sugar is too low, then there may be combined with the raw cane sugar the outer syrup film removed by washing of the raw sugar crystals and which outer syrup film will have an ash content of 2.0% to 3.0%.

By the term "raw cane sugar" as used in the specification and in the claims there is included not only the raw sugar which has been crystallized from the cane juice and which contains an outer film of non-crystallizable sugars and non-sugar impurities, but there is also included the outer syrup film which may be removed by washing the raw sugar crystals and which may be used in combination with other sweetening agents where the ash content originating from the outer syrup film or from the raw sugar is within the critical limits of 0.35% and 1.5% based upon total solids. There are also included the sugars remaining after the raw sugars have been washed to remove their outer syrup films.

For example, the raw sugar crystals may be washed to remove that portion of the raw sugar crystals which is contained in the outer surfaces of the individual crystals. This may be accomplished by the raw sugar crystals being placed into a centrifuge and washed with water to remove and concentrate the syrup film contained on the outer surfaces of the raw sugar crystals.

The outer film of the raw sugar crystals is desirably filtered through diatomaceous earth and there is preferably not used any charcoal, bone black, or other similar decolorizing agent in the filtration of the outer film.

The outer film may be concentrated either in a vacuum pan or in an open kettle and the filtration step may take place either before or after concentration.

This filtered, concentrated outer film will have a purity or a total sucrose content of from about 75% to about 83% although there may be some minor variations dependent upon the extent to which the raw sugar crystals are washed. Where the raw sugar crystals are washed for a longer period, the sucrose content may be as high as 87% and where the raw sugar crystals are washed with a relatively small amount of water the sucrose content may be as low as 70%.

The raw sugars crystallized from the original cane juice may be washed to remove the outer syrup film or, where desired, that portion which has not been crystallized into raw sugar from the cane juice may be recombined with additional cane juice and crystallized further producing a second batch of raw crystallized sugar which may then be washed to remove the outer syrup film. The outer syrup film may be removed from any of these raw sugar crystals as produced from the original cane juice or from cane juice containing compositions.

As examples of blends of sugars that may be utilized for acid and heat modification in accordance with the procedures of the present invention, the following may be noted:

(a)

| | Parts |
|---|---|
| Outer syrup film of raw cane sugar having an ash content of 2.0% | 1 |
| Refined cane sugar having an ash content of 0% | 3 |

Final ash content 0.5%

(b)

| | Parts |
|---|---|
| Raw cane sugar having an ash content of 0.6% | 1 |
| Outer syrup film of raw cane sugar having an ash content of 2.0% | 1 |
| Washed raw cane sugar left after removing outer syrup film, said washed raw cane sugar having an ash content of 0.2% | 4 |

Final ash content 0.53%.

(c)

| | Parts |
|---|---|
| Raw cane sugar having an ash content of 0.6% | 1 |
| Outer syrup film of raw cane sugar having an ash content of 2.0% | 2 |
| Refined cane sugar having an ash content of 0% | 2 |

Final ash content 0.92%.

It is of the greatest importance to subject the raw cane sugar to the elevated temperature treatment in excess of 245° F. and preferably to between 255° F. and 290° F., desirably under pressure, in order to obtain the most desirable results of the present invention. This is done where the raw cane sugar has been dissolved in water at a concentration of not less than about 40 Brix, the elevated temperature treatment varying from an instantaneous treatment to about 10 minutes and desirably not in excess of about 15 minutes.

Where the heat and acid modified and reacted raw cane sugar is to be used in the manufacture of a jelly and where it is also desired that some invert sugars be present so as to prevent crystallization of the sucrose, the acid and heat reacted raw cane sugar may subsequently be heated to about 180° F. to 210° F. and allowed to invert. It is preferable that the inversion take place after the heat and acid modification and reaction described. However, where desired, the raw cane sugar may be inverted prior to the heat and acid modification, but the heat and acid modification step is to be carried out desirably as a completely separate step from the inversion procedure.

There may also be included in the sugar composition of the present invention a small amount, up to about 10% to 20% of refiner's molasses or filtered refiner's molasses as an additional ingredient. Where refiner's molasses or similar intermediate refined sugar compositions are added, additional acid will have to be added in order to arrive at the critical pH limits of 2.5 to 3.6 and the added ingredients do not have to be heated to temperatures of over 245° F. to produce the heat modification herein described.

By the term "raw cane sugar ash" as used in the specification and claims is meant the ash of the raw cane sugar or the ash of raw cane sugar constituents such as the ash of the outer syrup film removed from the raw cane sugar or the ash of the sugar left after the outer syrup film has been removed from the raw cane sugar.

Having described my invention, what I claim is:

1. A sugar composition having a desirable fruit flavor and comprising the heat reaction products of raw cane sugars formed by heating raw cane sugars having an ash content between about 0.35% and 1.5% based upon total sugar solids to a temperature in excess of 245° F. for a period of between about 5 and 30 minutes and also comprising the acid reaction products of raw cane sugars formed by acidifying to a pH of between 2.5 and 3.6 and then removing precipitated materials.

2. A food composition having a desirable fruit flavor and comprising as a sugar composition ingredient the acid and heat reaction products of raw cane sugars, said raw cane sugars having an ash content of between 0.35% and 1.5% based on total sugar solids and said food composition having a pH of between 2.5 and 3.6, said reaction products being formed by heating a raw cane sugar syrup to a temperature of between about 245° F. and 290° F. for between 5 and 30 minutes, filtering to remove precipitated materials and acidifying to a pH of between 2.5 and 3.6.

3. A process of producing desirable fruit flavored sugar compositions which comprises providing a raw cane sugar with an ash content of between 0.35% and 1.5% based upon total sugar solids, heat reacting the raw cane sugars to an elevated temperature in excess of about 245° F. for about 5 to 30 minutes, filtering to remove precipitated materials, and acidifying the raw cane sugars to a pH of between 2.5 and 3.6.

4. A process of producing a sugar composition having a desirable fruit flavor which comprises heat reacting raw cane sugars to a temperature in excess of 245° F. for about 5 to 30 minutes, filtering to remove precipitated materials, blending said raw cane sugars with additional sugars so that the final blend has a raw cane sugar ash content of between 0.35% and 1.5% based upon total sugar solids, and acidifying the sugar composition to a pH of between 2.5 and 3.6.

5. A process of producing desirable fruit flavored sugar compositions which comprises providing a sugar syrup of at least about 50 Brix with a raw cane sugar ash content of 0.35% to 1.5%, heat and acid reacting the said sugar syrup at between 255° F. and 290° F. for about 5 to 30 minutes under pressure and as a pH of between 2.5 and 3.6, and then removing precipitated solids.

6. A process of producing a highly desirable fruit flavored jellified food composition which comprises providing a sugar syrup with a raw cane sugar ash content of between 0.35% and 1.5% based upon total sugar solids, partially acidifying the said sugar syrup, heat reacting the partially acidified sugar syrup under pressure to a temperature of between 255° F. and 290° F., removing the coagulated and precipitated materials by filtration, adding a sufficient amount of pectin to jellify the sugar syrup at the final pH of between 2.5 and 3.6, adding sufficient acid to produce a pH of between 2.5 and 3.6 and then concentrating to about 68 Brix.

7. A sugar composition having a desirable fruit flavor and comprising the heat and acid reaction products of raw cane sugar, said reaction products being formed by heating said sugars at a temperature of between about 245° F. and 290° F. for about 5 to 30 minutes followed by removal of precipitated materials and acidifying to a pH between 2.5 and 3.6 said raw cane sugar having an ash content of between 0.35% and 1.5% based on total sugar solids.

8. A sugar composition having a desirable fruit flavor and comprising the heat and acid reaction products of raw cane sugar, said reaction products being formed by heating said sugars at a temperature of between about 245° F. and 290° F. for about 5 to 30 minutes followed by removal of precipitated materials and acidifying to a pH between 2.5 and 3.6, said raw cane sugar having an ash content of between 0.35% and 1.5% based on total sugar solids.

9. A stable, jellified food composition comprising the heat and acid reaction products of raw cane sugar syrup and pectin, said reaction products being formed by heating said syrup at a temperature of between about 245° F. and 290° F. for about 5 to 30 minutes followed by removal of precipitated materials and acidifying to a pH between 2.5 and 3.6 said raw cane sugar syrup having an ash content of between 0.35% and 1.5% based on total sugar solids.

10. As a sweetening agent having a desirable fruit flavor, the heat and acid reaction products of raw cane sugars, said reaction products being formed by heating said sugars at a temperature of between about 245° F. and 290° F. for about 5 to 30 minutes followed by removal of precipitated materials and acidifying to a pH between 2.5 and 3.6, said raw cane sugars having an ash content of between 0.35% and 1.5% based on total sugar solids and said sweetening agent having a pH of between 2.5 and 3.6.

11. As a sweetening agent having a desirable fruit flavor the heat and acid reaction products of raw cane sugars, said reaction products being formed by heating said sugars at a temperature of between about 245° F. and 290° F. for about 5 to 30 minutes followed by removal of precipitated materials and acidifying to a pH between 2.5 and 3.6, said raw cane sugars having an ash of between 0.35% and 1.5% based on total sugar solids and said sweetening agents having a pH of between 2.5 and 3.6.

12. A process of producing a desirable fruit flavored sugar composition which comprises concentrating a raw cane sugar containing juice to at least about 40 Brix, acidifying to pH of between 4.5 and 5.5, heating to between about 245° F. and 290° F. for a period not exceeding 15 minutes, filtering, and then acidifying to pH of between 2.5 and 3.6, whereby a highly desirable fruit flavored sugar composition is obtained, said raw cane sugar juice containing between 0.35% and 1.5% total ash based upon total solids.

13. A process of producing fruit flavored sugar compositions which comprises dissolving 1000 parts by weight of raw cane sugar crystallized from defecated cane juice and containing 0.6% of ash based upon total solids in water to form a solution of 50 Brix, adding 6 parts by weight of a 50% aqueous solution of tartaric acid, heating under pressure to between 270° F. and 290° F for 5 minutes, cooling, filtering, adding 6 parts of a 50% tarataric acid solution to give a pH of 3.0, further concentrating to 68 Brix to produce a sugar composition having a highly desirable fruit aroma and flavor.

14. A process of forming a fruit flavored, raw cane sugar composition which comprises dissolving 100 parts by weight of raw cane sugar containing 0.6% of ash based upon total solids in water to form a solution of 50 Brix, adding sufficient phosphoric acid to produce a pH of 5.0, heating under pressure at a temperature of 270° F. for about 10 minutes, cooling, filtering, concentrating to 75 Brix, adding 10 parts by weight of a 4% pectin solution with agitation, adjusting the solution to 65 Brix, adding phosphoric acid to produce a pH of 2.9 and then causing the material to cool and set.

15. A process of forming a fruit flavored, raw sugar composition which comprises dissolving defecated raw cane sugar in water to form a solution of 50 Brix, said raw cane sugar containing 0.6% of ash based upon total solids, heating to 275° F. under pressure, cooling, filtering, concentrating to 75 Brix, acidifying to pH 3.1 by phosphoric acid whereby a desirable fruit flavor is obtained.

ALEXANDER M. ZENZES.

REFERENCES CITED

The following references are of record in the file of this patent:

UNITED STATES PATENTS

| Number | Name | Date |
|---|---|---|
| 2,046,567 | Lund | July 7, 1936 |
| 2,072,895 | Lund | Mar. 9, 1937 |
| 2,098,604 | Whymper | Nov. 9, 1937 |
| 2,176,034 | Musher | Oct. 10, 1939 |
| 1,826,701 | Ames | Oct. 13, 1931 |
| 2,054,823 | Whitby | Sept. 22, 1936 |
| 2,261,919 | Pittman | Nov. 4, 1941 |
| 1,531,271 | Slay | Apr. 7, 1925 |

FOREIGN PATENTS

| Number | Country | Date |
|---|---|---|
| 308,850 | Germany | 1918 |
| 16,540 | Great Britain | 1889 |
| 17,557 | Great Britain | 1890 |
| 28,742 | Great Britain | 1909 |

OTHER REFERENCES

Int. Sugar Jr., July 1944, page 190.